US008935910B2

United States Patent
Cournoyer et al.

(10) Patent No.: US 8,935,910 B2
(45) Date of Patent: Jan. 20, 2015

(54) ROTARY OIL DEGRADATION BYPRODUCTS REMOVAL SYSTEM

(75) Inventors: Mark Andrew Cournoyer, Coventry, RI (US); Huong Van Vu, Duluth, GA (US); Eric Milton Lafontaine, Atlanta, GA (US); Bhalchandra Arun Desai, Smyrna, GA (US); Avnit Singh, Marietta, GA (US); Michael Adelbert Sullivan, Woodstock, GA (US)

(73) Assignee: General Electric Company, Schenectady, NY (US)

( * ) Notice: Subject to any disclaimer, the term of this patent is extended or adjusted under 35 U.S.C. 154(b) by 602 days.

(21) Appl. No.: 13/280,284

(22) Filed: Oct. 24, 2011

(65) Prior Publication Data
US 2013/0097990 A1 Apr. 25, 2013

(51) Int. Cl.
F02C 7/06 (2006.01)
F02C 3/06 (2006.01)
F01D 25/18 (2006.01)
F16N 39/00 (2006.01)
B03C 5/02 (2006.01)

(52) U.S. Cl.
CPC . *B03C 5/02* (2013.01); *F16N 39/00* (2013.01); *F05D 2260/609* (2013.01); *F01D 25/18* (2013.01)
USPC ........... 60/39.08; 60/802; 184/6.11; 184/6.21

(58) Field of Classification Search
USPC .......... 60/39.08, 802, 39.091; 184/6.11, 6.21, 184/6.24, 6.25
See application file for complete search history.

(56) References Cited

U.S. PATENT DOCUMENTS

| 3,661,746 A | | 5/1972 | Lucas |
| 3,722,693 A | | 3/1973 | Stull |
| 3,979,189 A | | 9/1976 | Alskog |
| 4,170,873 A | * | 10/1979 | Milo ............................ 60/39.08 |
| 4,620,917 A | | 11/1986 | Nozawa et al. |
| 4,961,845 A | * | 10/1990 | Dawson et al. ............... 204/663 |
| 5,501,783 A | | 3/1996 | Kawasaki |
| 5,935,303 A | | 8/1999 | Kimura |
| 5,954,933 A | | 9/1999 | Ingalls et al. |
| 6,526,741 B2 | | 3/2003 | Whitehead et al. |
| 6,658,850 B1 | | 12/2003 | House et al. |
| 6,793,801 B2 | | 9/2004 | Holland |
| 6,902,604 B2 | | 6/2005 | Heckel et al. |
| 7,681,402 B2 | * | 3/2010 | Champion et al. .............. 60/779 |
| 7,744,739 B1 | * | 6/2010 | Green .......................... 204/665 |
| 2006/0278584 A1 | | 12/2006 | Bowden et al. |
| 2007/0039896 A1 | | 2/2007 | Bowden et al. |
| 2008/0178737 A1 | | 7/2008 | Dooley |
| 2008/0302663 A1 | | 12/2008 | Jarvis |
| 2011/0239660 A1 | | 10/2011 | Suciu et al. |

FOREIGN PATENT DOCUMENTS

JP 56163713 A 12/1981

OTHER PUBLICATIONS

U.S. Appl. No. 13/280,275, filed Oct. 24, 2011, Mark Andrew Cournoyer et al.

* cited by examiner

*Primary Examiner* — Gerald L Sung
(74) *Attorney, Agent, or Firm* — Fletcher Yoder, P.C.

(57) ABSTRACT

Embodiments of the present disclosure include an oil degradation byproducts removal system. The oil degradation byproducts removal system includes a plurality of electrostatically-charged drum assemblies configured to pass through an oil flow. The oil degradation byproducts removal system is configured to be disposed within an accessory module of a turbine engine system.

20 Claims, 4 Drawing Sheets

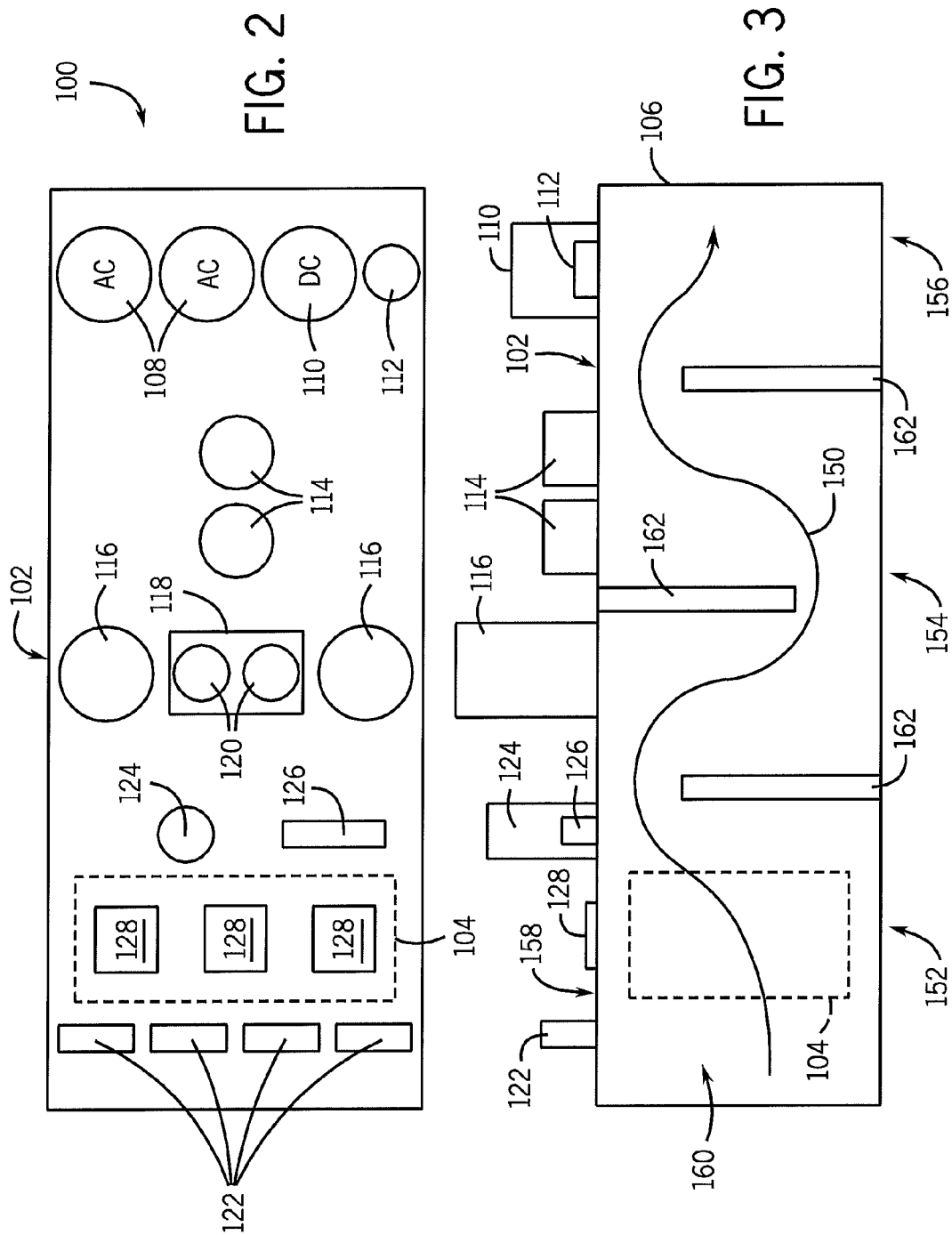

ROTARY OIL DEGRADATION BYPRODUCTS REMOVAL SYSTEM

BACKGROUND OF THE INVENTION

The subject matter disclosed herein relates to turbine systems, and, more particularly, to a rotary oil degradation byproducts removal system for a turbine lubrication system.

A turbine is a rotary engine which converts energy from a fluid flow into rotational (e.g., mechanical) energy. Turbine systems may be used in a variety of power generation systems. Generally, gas turbine systems include lubricating systems which serve to reduce wear and friction between components of the turbine. Specifically, the lubricating system circulates oil throughout the turbine system to facilitate smooth operation of the turbine and its components. Unfortunately, the oil used within the lubricating system may be susceptible to quality degradation. Over time, oil degradation byproducts, such as varnish, can develop within the oil and decrease the effectiveness of the lubrication system. For example, varnish formation can cause degradation of turbine system components and the lubrication system, reduce or impede oil flow through the turbine system, cause higher operating temperatures of the turbine system, and so forth.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an accessory module for a turbine engine system including a lubricating oil reservoir and an oil degradation byproducts removal system. The oil degradation byproducts removal system includes electrostatically-charged drum assemblies configured to remove oil degradation byproducts from lubricating oil flowing through the lubricating oil reservoir, and the oil degradation byproducts removal system is configured to be disposed internal to the lubricating oil reservoir.

In a second embodiment, a system includes an oil degradation byproducts removal system configured to flow a lubricating oil flow. The oil degradation byproducts removal system includes electrostatically-charged drum assemblies, wherein each of electrostatically-charged drum assemblies is coupled to a support structure configured to suspend the electrostatically-charged drum assemblies within the oil degradation byproducts removal system. The oil degradation byproducts removal system also includes a motor configured to drive rotation of the support structure within the oil degradation byproducts removal system. Further, the oil degradation byproducts removal system is configured to be disposed internal to an accessory module of a turbine engine system.

In a third embodiment, a system includes a turbine engine system and an accessory module. The accessory module includes a lubricating oil reservoir configured to supply lubricating oil to the turbine engine system and an oil degradation byproducts removal system disposed within the lubricating oil reservoir. The oil degradation byproducts removal system comprises a plurality of electrostatically-charged drum assemblies and the plurality of electrostatically-charged drum assemblies is configured to electrostatically remove oil degradation byproducts from a flow of lubricating oil within the lubricating oil reservoir.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a top view of an embodiment of an accessory module used with a lubricating system for a gas turbine system, where the accessory tank includes a lubricating oil reservoir having a rotary oil degradation byproducts removal system;

FIG. 3 is a side view of the accessory module of FIG. 2, illustrating an oil flow through the lubricating oil reservoir and the rotary oil degradation byproducts removal system;

DETAILED DESCRIPTION OF THE INVENTION

Figure 1:
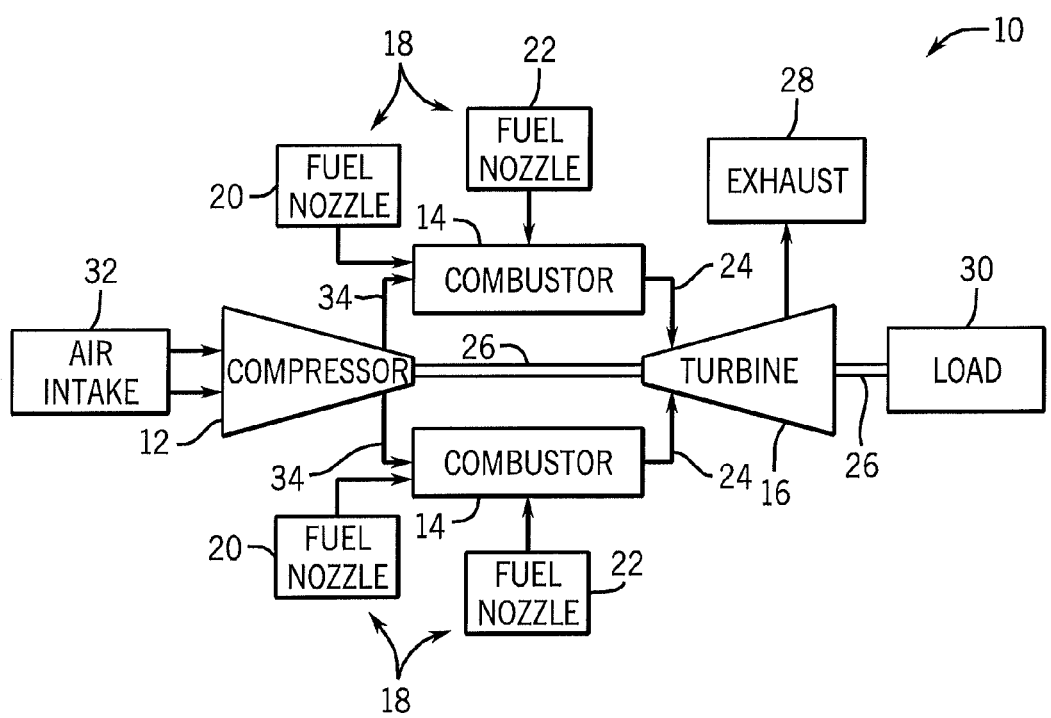
FIG. 1 is a schematic block diagram of an embodiment of a gas turbine system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include a rotary oil degradation byproducts removal system for a turbine system. More specifically, the rotary oil degradation byproducts removal system is integrated with a lubricating oil reservoir of an accessory module of the turbine system, and is configured to electrostatically remove degradation byproducts from oil flowing through the lubricating oil reservoir. As will be appreciated, oil is a non-polar substance. However, as oil degrades, it develops degradation byproducts, which may have polar components. The polar components may attract one another to form varnish and other contaminants. These polar components may measure less than one micron in size, and as such may not be removable via mechanical filtration techniques.

As discussed in detail below, the rotary oil degradation byproducts removal system includes a plurality of electrostatic drum assemblies mounted to a rotary assembly within the lubricating oil reservoir. The electrostatic drum assemblies of the rotary oil degradation byproducts removal system include nested electrostatic drums that are configured to attract and collect the polar components of the oil degradation byproducts as the oil flows through the lubricating oil reservoir, thereby removing the byproducts from the oil. More specifically, the rotary oil degradation byproducts removal system includes positively charged electrostatic drums and negatively charged electrostatic drums which may be rotated or passed through the oil flow. In this manner, the polar byproduct components of the degraded oil will be attracted to the electrostatic drums of opposite polarity, and will be removed from the oil flowing through the lubricating oil reservoir. As a result, oil degradation byproduct particles may be removed from the oil, thereby increasing the oil quality, reducing varnish within the turbine system, and extending the useful life of the oil.

Turning now to the drawings, FIG. 1 illustrates a block diagram of an embodiment of a gas turbine system 10. The diagram includes a compressor 12, turbine combustors 14, and a turbine 16. The turbine combustors 14 include fuel nozzles 18 which route a liquid fuel and/or gas fuel, such as natural gas or syngas, into the turbine combustors 14. As shown, each turbine combustor 14 may have multiple fuel nozzles 18. More specifically, the turbine combustors 14 may each include a primary fuel injection system having primary fuel nozzles 20 and a secondary fuel injection system having secondary fuel nozzles 22. As described in detail below, the gas turbine system 10 may also include an oil degradation byproducts removal system configured to remove oil degradation byproducts from lubricating oil used in the turbine system 10.

The turbine combustors 14 ignite and combust an air-fuel mixture, and then pass hot pressurized combustion gasses 24 (e.g., exhaust) into the turbine 16. Turbine blades are coupled to a shaft 26, which is also coupled to several other components throughout the turbine system 10. As the combustion gases 24 pass through the turbine blades in the turbine 16, the turbine 16 is driven into rotation, which causes the shaft 26 to rotate. Eventually, the combustion gases 24 exit the turbine system 10 via an exhaust outlet 28. Further, the shaft 26 may be coupled to a load 30, which is powered via rotation of the shaft 26. For example, the load 30 may be any suitable device that may generate power via the rotational output of the turbine system 10, such as a power generation plant or an external mechanical load. For instance, the load 30 may include an electrical generator, a propeller of an airplane, and so forth.

In an embodiment of the turbine system 10, compressor blades are included as components of the compressor 12. The blades within the compressor 12 are coupled to the shaft 26, and will rotate as the shaft 26 is driven to rotate by the turbine 16, as described above. The rotation of the blades within the compressor 12 compress air from an air intake 32 into pressurized air 34. The pressurized air 34 is then fed into the fuel nozzles 18 of the combustors 14. The fuel nozzles 18 mix the pressurized air 34 and fuel to produce a suitable mixture ratio for combustion (e.g., a combustion that causes the fuel to more completely burn) so as not to waste fuel or cause excess emissions.

FIG. 2 is a top view of an embodiment of an accessory module 100 having a lubrication system 102 configured to provide lubricating oil to the gas turbine system 10. As discussed in detail below, the lubrication system 102 includes an oil degradation byproducts removal system 104 that is disposed within the lubrication system 102. That is, the oil degradation byproducts removal system 104 is internal to the lubrication system 102. The accessory module 100 includes a variety of other components which operate the lubrication system 102.

In the illustrated embodiment, the accessory module 100 includes a lubricating oil reservoir 106, which serves as a base of the accessory module 100. In other words, the reservoir 106 provides a structural mounting platform for the other components of the accessory module 100 and the lubrication system 102. The lubricating oil reservoir 106 contains the lubricating oil that is supplied to the gas turbine system 10. For example, the lubricating oil may be supplied to bearings or other moving parts of the gas turbine system 10. In certain embodiments, the lubricating oil reservoir 106 may be configured to contain 100 to 10000, 200 to 8000, 400 to 6000, 800 to 4000, or 1000 to 2000 gallons of lubricating oil. The lubricating oil reservoir 106 is further designed to provide a place for the lubricating oil to degas any entrained air that may have been collected by the oil during circulation through the gas turbine system 10. For example, as discussed below, the lubricating oil reservoir 106 may include baffles to control the flow of the oil and to maximize degassing.

The accessory module 100 also includes AC lube pumps 108, which are powered by alternating current electrical power. The AC lube pumps 108 operate to provide the lubricating oil to the gas turbine system 10. In the illustrated embodiment, the accessory module 100 includes two AC lube pumps 108 for redundancy. That is, if one AC lube pump 108 does is not operational, the second AC lube pump 108 may still provide oil to the turbine system 10. Additionally, the accessory module 100 includes a DC lube pump 110, which are powered by direct current electrical power. The DC lube pump 110 is configured to provide oil to the turbine system 10 in a shutdown situation when AC power is lost. That is, if AC power is not available to power the AC lube pumps 106, the DC lube pump 110 will temporarily supply oil to the turbine system 10.

In the illustrated embodiment, the accessory module 100 also includes an AC/DC seal oil pump 112. The AC/DC seal oil pump 112 is configured to provide lubricating oil to the seals of a hydrogen cooled generator, when a hydrogen cooled generator is used. More specifically, the AC/DC seal oil pump 112 provides sealing oil when the AC lube pumps 108 are not in operation. For example, the AC/DC seal oil pump 112 may be in operation during maintenance of the AC lube pumps 108. The accessory module 100 further includes oil filters 114. The oil filters 114 are capable of filtering the full flow of oil from the lube oil pumps 108, 110. As shown, the oil filters 114 are configured in a dual arrangement (i.e., there are two separate oil filter assemblies) such that one oil filter 114 is in service at any given time. In other words, one oil filter 114 is online while the second oil filter 114 is in standby mode. If necessary, the standby oil filter 114 can be placed in service and the online oil filter 114 can be taken out of service while the gas turbine system 10 is in operation.

Oil coolers 116 are included with the accessory module 100 and the lubrication system 102 for maintaining a desired oil temperature. As will be appreciated, the accessory module 100 may be exposed to a wide range of ambient temperatures depending on the location of the accessory module 100. As such, the oil coolers 116 function to maintain the temperature of the oil at or below a desired oil temperature in locations having higher ambient temperatures. As with the oil filters 114, the oil coolers 116 are configured in a dual arrangement such that one oil cooler 116 is in service at any given time. If the need arises, the standby oil cooler 116 can be placed into service, and the online oil cooler 116 can be taken out of service while the turbine system 10 is in operation.

Additionally, the accessory module 100 includes a hydraulic power unit 118 having hydraulic/lift pumps 120. The hydraulic/lift pumps 120 are dual compensator pumps which provide hydraulic oil to valve actuators of fuel gas control valves 122. Additionally, during turning gear operation, the pumps 120 provide lifting oil to the bearings of the turbine system 10. In certain embodiments, the pumps 120 are dual compensator pumps. For example, the pumps 120 may be used in applications where hydraulic pressure requirements may be different than lift pressure requirements. Furthermore, two pumps 120 are provided for redundancy.

The accessory module 100 includes additional components such as a mist eliminator 124 and a fuel gas strainer 126. The mist eliminator 124 may include air extraction blowers and coalescing filters to provide a slight vacuum in the lubricating oil reservoir 106. Additionally, the mist eliminator 124 may be configured to provide a vacuum in drain lines of the lubrication system 102. The vacuum created by the mist eliminator 124 in the lubricating oil reservoir 106 and the drain lines assists in degassing of the oil and maintaining a desired pressure in the lubrication system 102. In certain embodiments, the mist eliminator 124 may include two air extraction blowers for redundancy. The fuel gas strainer 126 is configured to provide protection of downstream gas system components. For example, the fuel gas strainer 126 helps prevent large objects, such as those introduced during maintenance activities, from impacting the operation of the gas system components. Moreover, as mentioned above, the illustrated embodiment of the accessory module 100 includes fuel gas control valves 122. The fuel gas control valves 122 are designed to meter the correct amount of fuel to the various fuel nozzles 18 in the combustors 14 of the gas turbine system 10. While the illustrated embodiment includes four fuel gas control valves 122, other embodiments may include 1, 2, 3, 5, 6, or more fuel gas control valves 122. For example, the accessory module 100 may include one fuel gas control valve 122 for each fuel nozzle 18 in the combustors 14 of the gas turbine system 10.

As mentioned above, the lubrication system 102 includes the oil degradation byproducts removal system 104, which is internal to the lubrication system 102. The oil degradation byproducts removal system 104 is configured to electrostatically remove oil degradation byproducts from the oil passing through the lubricating oil reservoir 106. As discussed above, oil degradation byproducts contain polar components that have positive and/or negative charges. The oil degradation byproducts removal system 104 operates to remove the polar components by attracting and collecting the polar components with oppositely-charged electrostatic collectors, e.g., drums, as discussed in detail below. As the polar components collect on the electrostatic collectors, varnish will begin to form in the manner described above. In certain embodiments, the electrostatic collectors are removable and replaceable, as needed. For example, after the electrostatic collectors have collected polar components of the oil and varnish that has developed, the electrostatic collectors may be removed from the oil degradation byproducts removal system 104 and replaced with different electrostatic collectors. Additionally, in certain embodiments, the electrostatic collectors may be removed while the accessory tank 100 and its components are in operation. Furthermore, in the illustrated embodiment, the accessory module 100 includes sight glasses 128. Specifically, the sight glasses 128 are generally transparent panels of glass or other material built into the accessory module 100 which enable an operator to view the electrostatic collectors of the oil degradation byproducts removal system 104 inside the lubricating oil reservoir 106. In other words, an operator outside of the accessory module 100 may look through the sight glasses 128 to view an interior of the lubricating oil reservoir 106, and thus view the electrostatic collectors of the oil degradation byproducts removal system 104. In this manner, an operator may be able to see varnish forming within the lubricating oil reservoir 106 and on the electrostatic collectors, thereby assisting the operator in determining when the electrostatic collectors need to be replaced.

FIG. 3 is a side view of the accessory module 100 of FIG. 2, illustrating an oil flow 150 through the lubricating oil reservoir 106 and the oil degradation byproducts removal system 104. In the illustrated embodiment, the oil degradation byproducts removal system 104 is located at a front 152 of the accessory module 100. However, in other embodiments, the oil degradation byproducts removal system 104 may be located in other areas of the accessory module 100, such as a middle 154 or rear 156 of the accessory module 100. Moreover, certain embodiments of the oil degradation byproducts removal system 104 may be installed through a top 158 of the accessory module 100. In other embodiments, the oil degradation byproducts removal system 104 may be installed through a side 160 of the accessory module 100. For example, the top 158 and/or the sides 160 of the accessory module 100 may include one or more doors, hatches, or other openings configured through which the oil degradation byproducts removal system 104 may be passed. In this manner, the oil degradation byproducts removal system 104 may be installed in the accessory module 100 and removed from the accessory module 100, as needed. Additionally, while the top 158 and/or sides 160 of the accessory module 100 may include doors, hatches, or other openings, the top 158 and/or sides 160 may also include the sight glasses 128. For example, in certain embodiments, the sight glasses 128 may be disposed on the doors, hatches, or other openings.

As shown, the flow 150 of lubricating oil travels through the oil reservoir 106 from the front 152 to the rear 156 of the accessory module 100. As will be appreciated, the lubricating oil reservoir 106 receives the lubricating oil from the various components of the turbine system 10. Once the oil flows through the oil degradation byproducts removal system 104 and the lubricating oil reservoir 106, the lube pumps 108, 110 re-circulate the lubricating oil to the components of the turbine system 10. In certain embodiments, the lubricating oil reservoir 106 includes baffles 162 which are configured to control the flow 150 of the lubricating oil, as well as assist in the degassing of the oil. As mentioned above, the oil may entrain air during operation. The flow of the oil within the lubricating oil reservoir 106 may be slowed by the baffles 162, thereby increasing the length of time the oil is within the lubricating oil reservoir 106 and allowing entrained air to further vent from the oil. Furthermore, as the oil passes through lubricating oil reservoir 106, the lubricating oil reservoir 106 may be placed under a slight vacuum to help remove any degassed air.

Figure 4:
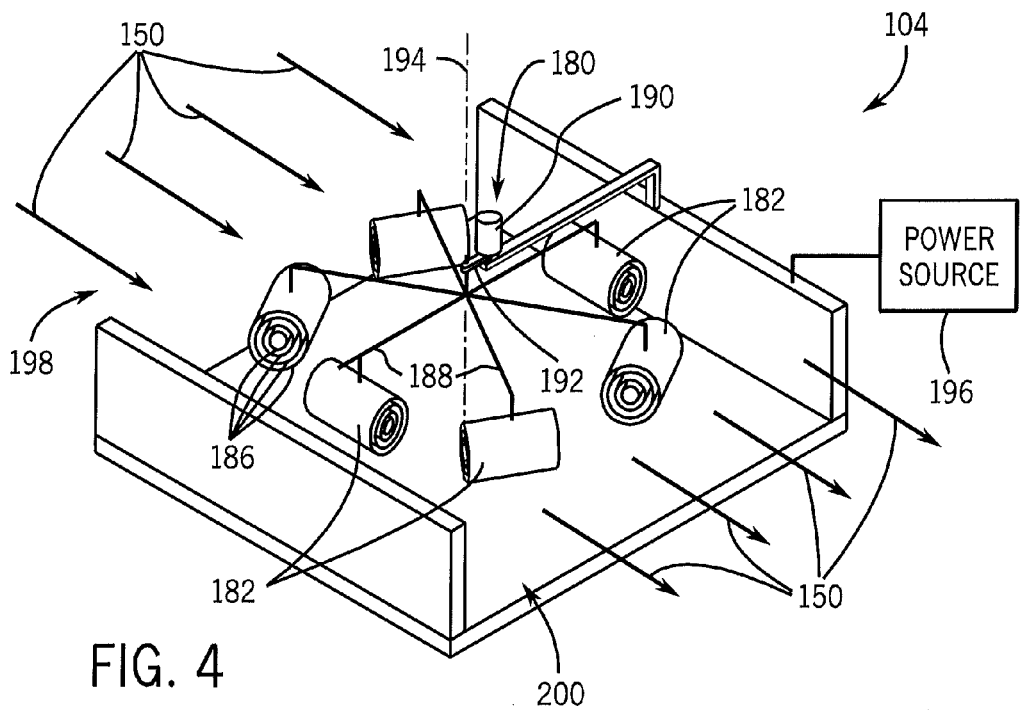
FIG. 4 is a perspective view of an embodiment of the rotary oil degradation byproducts removal system, illustrating a rotary assembly having electrostatic drum assemblies.

FIG. 4 is a perspective view of an embodiment of the rotary oil degradation byproducts removal system 104, illustrating a rotary assembly 180 having electrostatic drum assemblies 182. More specifically, the rotary assembly 180 is configured to rotate the electrostatic drum assemblies 182 within the rotary oil degradation byproducts removal system 104 as the oil flow 150 flows through the rotary oil degradation byproducts removal system 104. In the illustrated embodiment, the electrostatic drum assemblies 182 each have a cylindrical configuration. In other embodiments, the electrostatic drum assemblies 182 may include rectangular, triangular, or other polygonal shapes. As shown, each of the electrostatic drum assemblies 182 includes a nested arrangement of individual electrostatically charged drums 186 that are generally concentric with each other. In the illustrated embodiment, each drum assembly 182 includes four individual nested electrostatically charged drums 186. Other embodiments may include 1 to 20, 2 to 15, 3 to 10, or 4 to 8 individual nested electrostatically charged drums 186. Similarly, in the illustrated embodiment, the rotary assembly 180 includes six drum assemblies 182. However, in other embodiments, the rotary assembly 180 may include 1 to 50, 2 to 40, 3 to 30, 4 to 20 or 5 to 10 electrostatic drum assemblies 182. As discussed in detail below, the electrostatic charge of the individual drums 186 may be positive or negative. For example, all individual nested electrostatically charged drums 186 in one electrostatic drum assembly 182 may have the same charge. Alternatively, the nested electrostatically charged drums 186 in one electrostatic drum assembly 182 may have different charges, for example, alternating between adjacent electrostatically charged drums 186.

The electrostatic drum assemblies 182 are supported and suspended within the rotary oil degradation byproducts removal system 104 by a support structure 188. As shown, the support structure 188 is coupled to a motor 190, such as an electric motor. The motor 190 is configured to drive the rotation of the support structure 188 and the electrostatic drum assemblies 182. Specifically, in the illustrated embodiment, the motor 190 drives a belt 192 coupled to the support structure 188, thereby rotating the support structure 188 and the drum assemblies 182 about an axis 194. As shown, the axis 194 of rotation is generally perpendicular to the oil flow 150 and extends through the top and the bottom of the oil degradation byproducts removal system 104. As the motor 190 drives the rotation of the rotary assembly 180. More specifically, the support structure 188 is rotated about the axis 194, and the electrostatic drum assemblies 182 coupled to the support structure 188 move through the oil flow 150 about the axis 194. In other embodiments, the axis 194 of rotation may have other orientations relative to the oil flow 150. For example, while the axis 194 of rotation in the illustrated embodiment is generally vertical, in other embodiments, the axis 194 of rotation may be generally horizontal. Similarly, axis 194 of rotation may at other angles relative to the oil flow 150. For example, the axis 194 of rotation may be at an angle of 0 to 90, 10 to 80, 20 to 70, 30 to 60, or 40 to 50 degrees to the oil flow 150. The rotary oil degradation byproducts removal system 104 further includes a power source 196 which may power the motor 190 and/or supply an electrostatic charge to the electrostatic drum assemblies 182.

As discussed above, the rotary oil degradation byproducts removal system 104 is disposed within, i.e., internal to, the lubricating oil reservoir 106 of the accessory module 100. As the lubricating oil flows through the rotary oil degradation byproducts removal system 104, polar components of the oil degradation byproducts are attracted to the electrostatically charged drums 186 of the electrostatic drum assemblies 182. Specifically, the electrostatically charged drums 186 each have an electrostatic charge, which may be provided by the power source 196, such as a 120V power supply. Due to the electrostatic charge of the electrostatically charged drums 186, the electrostatically charged drums 186 attract oppositely charged polar components of the oil degradation byproducts. For example, positively charged byproducts are attracted to negatively charged drums 186, and negatively charged byproducts are attracted to positively charged drums 186. In certain embodiments, the electrostatically charged drums 186 may attract polar byproduct components as small as one micron in size. In this manner, as the lubricating oil flows through the rotary oil degradation byproducts removal system 104, the polar components of the oil degradation byproducts attach to the electrostatically charged drums 186, and are therefore removed from the flow 150 of lubricating oil. In the illustrated embodiment, the oil flow 150 enters the rotary oil degradation byproducts removal system 104 through a first side 198 of the rotary oil degradation byproducts removal system 104, and exits through a second side 200 of the rotary oil degradation byproducts removal system 104. As will be appreciated, the flow 150 of lubricating oil exiting the rotary oil degradation byproducts removal system 104 at the second side 200 may contain fewer oil degradation byproducts than the flow 150 of oil entering the rotary oil degradation byproducts removal system 104 at the first side 198.

As mentioned above, the oil degradation byproducts removal system 104 may be a modular, removable unit. In other words, the oil degradation byproducts removal system 104 may be removed from the accessory module 100 for cleaning, repair, or replacement. For example, the oil degradation byproducts removal system 104 may be removed through a door, hatch, or other opening in the accessory module 100. Furthermore, the accessory module 100 may include one or more sight glasses 128 through which an operator can view the oil degradation byproducts removal system 104, the electrostatic drum assemblies 182 and the electrostatically charged drums 186. In this manner, the operator can identify varnish developing on the electrostatic drum assemblies 182 while the oil degradation byproducts removal system 104 is in operation and thereby determine when the oil degradation byproducts removal system 104 should be removed from the accessory module 100 for cleaning or replacement. In certain embodiments, the electrostatic drum assemblies 182 may be removed from the oil degradation byproducts removal system 104 to be cleaned. More specifically, each individual electrostatically charged drum 186 may be removed from its respective electrostatic drum assembly 182 for cleaning or replacement. Thereafter, the cleaned electrostatically charged drum 186 or the replacement electrostatically charged drum 186 may be re-assembled with the electrostatic drum assembly 182, and the electrostatic drum assembly may be re-installed for reuse in the oil degradation byproducts removal system 104. In other embodiments, the electrostatic drum assemblies 182 may be removed and cleaned or replaced as a single unit. After the electrostatic drum assemblies 182 are cleaned or replaced, the oil degradation byproducts removal system 104 may then be reinstalled within the accessory module 100.

Figure 5:
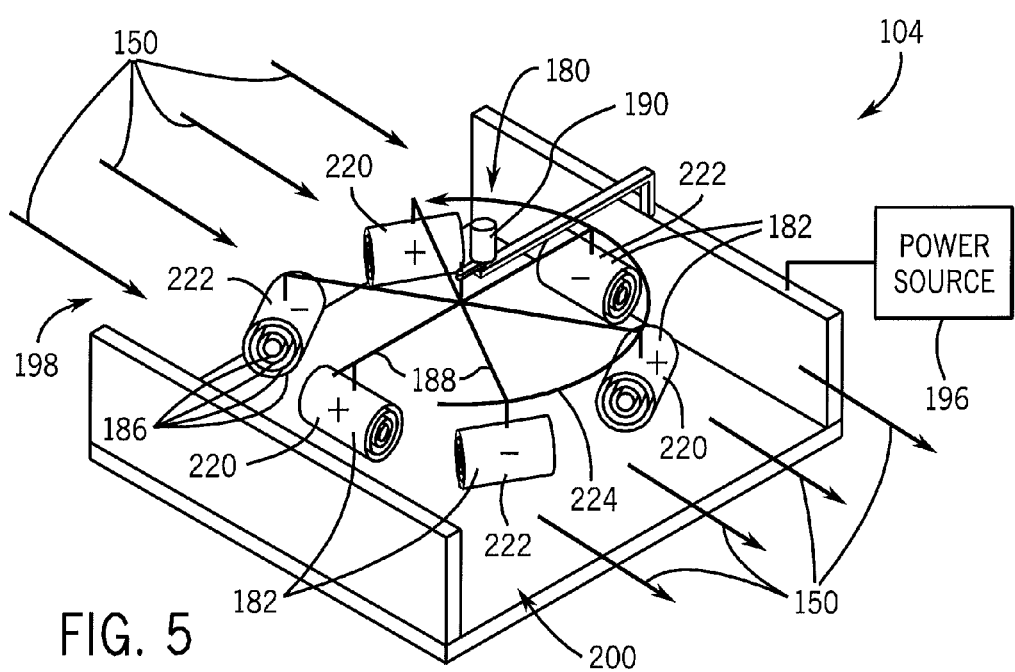
FIG. 5 is a perspective view of an embodiment of the rotary oil degradation byproducts removal system, illustrating a rotary assembly having electrostatic drum assemblies.

FIG. 5 is a perspective view of an embodiment of the rotary oil degradation byproducts removal system 104, illustrating the rotary assembly 180 having electrostatic drum assemblies 182, where each of the electrostatically charged drums 186 of each electrostatic drum assembly 182 have the same electrostatic charge as the other electrostatically charged drums 186 of the respective electrostatic drum assembly 182. Additionally, the electrostatic charge of each electrostatic drum assembly 182 alternates between each of the electrostatic drum assemblies 182 around the annular formation of electrostatic drum assemblies 182. For example, in the illustrated embodiment, the rotary assembly 180 has three positively charged electrostatic drum assemblies 220. Similarly, the rotary assembly 180 has three negatively charged electrostatic drum assemblies 222. In other words, each electrostatically charged drum 186 in the positively charged electrostatic drum assemblies 220 has a positive electrostatic charge and will attract negative polar degradation components of the oil flow 150 passing through the rotary oil degradation byproducts removal system 104. Moreover, each electrostatically charged drum 186 in the negatively charged electrostatic drum assemblies 222 has a negative electrostatic charge and will attract positive polar degradation components of the oil flow 150. Furthermore, in certain embodiments, the electrostatic drum assemblies 182 are arranged in the rotary oil degradation byproducts removal system 104 such that the positively and negatively charged electrostatic drum assemblies 220 and 222 alternate about a circumference 224 of the rotary assembly 180. In other embodiments, the rotary oil degradation byproducts removal system 104 may include any number of positively charged electrostatic drum assemblies 220 and/or negatively charged electrostatic drum assemblies 222. Additionally, the positively and negatively charged electrostatic drum assemblies 220 and 222 may be arranged in configurations other than the alternating arrangement illustrated in FIG. 5.

Figure 6:
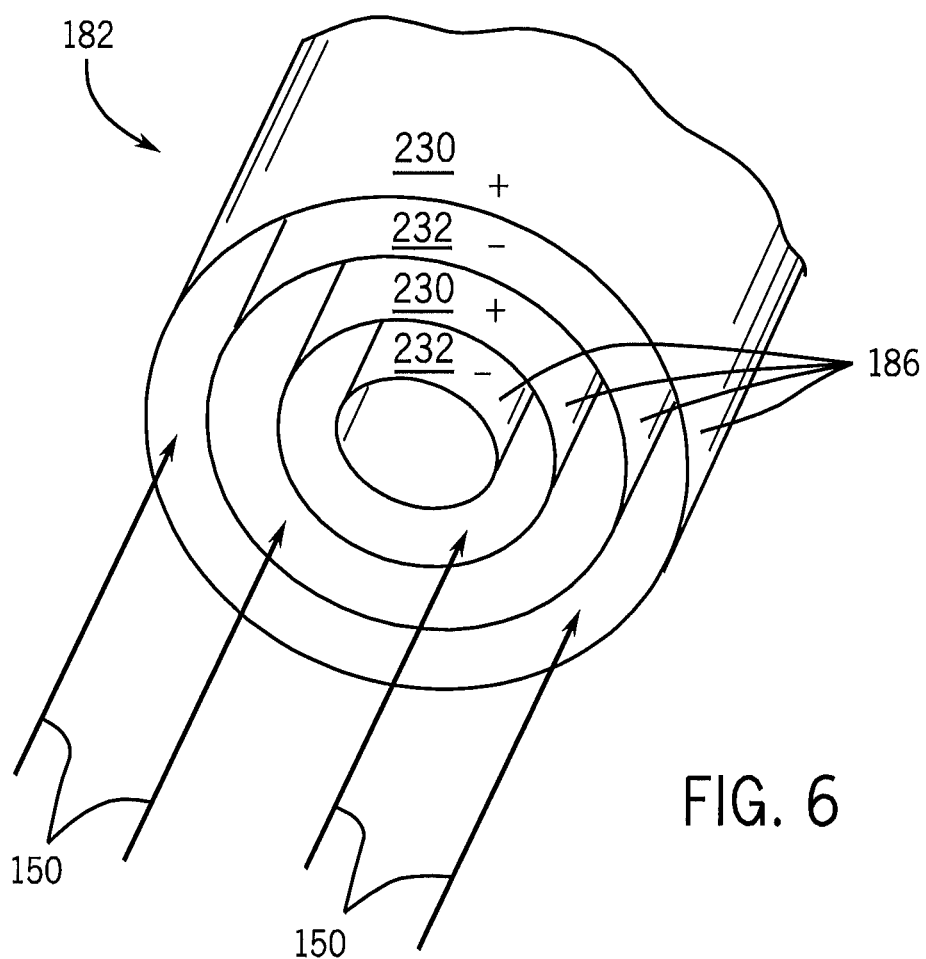
FIG. 6 is a schematic of an embodiment of an electrostatic drum assembly, wherein the drum assembly includes nested drums having alternating electrostatic charges.

FIG. 6 is perspective view of an embodiment of the electrostatic drum assembly 182 having individual nested electrostatically charged drums 186, illustrating an alternating arrangement of positively and negatively charged drums 186. In the illustrated embodiment, the electrostatic drum assembly 182 includes four individual nested electrostatically charged drums 186. Other embodiments of the electrostatic drum assembly 182 may include 1 to 50, 2 to 40, 3 to 30, 4 to 20, or 5 to 10 individual nested electrostatically charged drums 186. Additionally, the electrostatic drum assembly 182 includes positively charged drums 230 and negatively charged drums 232. As discussed above, negatively charged polar degradation components in the oil flow 150 will be attracted to, and collected by, the positively charged drums 230. Similarly, positively charged polar degradation components will be attracted to, and collected by, the negatively charged drums 232. As shown, the positively and negatively charged drums 230 and 232 are nested within one another in an alternating concentric arrangement. As will be appreciated, certain embodiments of the oil degradation byproducts removal system 104 may have drum assemblies 182 with different arrangements of drums 186. For example, in an embodiment of the oil degradation byproducts removal system 104 having multiple drum assemblies 182 with alternating positively and negatively charged drums 230 and 232, a number of drum assemblies 182 may have an innermost drum 186 that is positively charged, and a number of drum assemblies 182 may have an innermost drum 186 that is negatively charged. Additionally, the different configurations of the drum assemblies 182 may be positioned in an alternating arrangement about the support structure 188. In other embodiments of the oil degradation byproducts removal system 104, each electrostatic drum assembly 182 may have the same configuration.

As discussed in detail above, the present embodiments are directed toward a rotary oil degradation byproducts removal system 104 disposed within an accessory module 100 of a gas turbine system 10. More specifically, the rotary oil degradation byproducts removal system 104 is disposed internal to the lubricating oil reservoir 106 of the accessory module 100. The rotary oil degradation byproducts removal system 104 includes electrostatic drum assemblies 182, which are configured to remove polar components of oil degradation byproducts as lubricating oil flows through the lubricating oil reservoir 106 and the rotary oil degradation byproducts removal system 104. The electrostatic drum assemblies 182 include either or both positively and negatively charged drums 186. As a result, the electrostatic drum assemblies 182 attract and collect oppositely charged polar components of oil degradation byproducts in the oil flow 150 within the lubricating oil reservoir 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    an accessory module for a turbine engine system, comprising:
        a lubricating oil reservoir; and
        an oil degradation byproducts removal system comprising:
            electrostatically-charged drum assemblies configured to remove oil degradation byproducts from lubricating oil flowing through the lubricating oil reservoir; and
            a rotary assembly configured to drive rotation of the electrostatically-charged drum assemblies within the lubricating oil reservoir;
        wherein the oil degradation byproducts removal system is configured to be disposed internal to the lubricating oil reservoir.

2. The system of claim 1, wherein each of the electrostatically-charged drum assemblies comprises electrostatically-charged drums in a nested concentric arrangement.

3. The system of claim 2, wherein each of the electrostatically-charged drums has a positive electrostatic charge.

4. The system of claim 2, wherein each of the electrostatically-charged drums has a negative electrostatic charge.

5. The system of claim 1, wherein each of the electrostatically-charged drum assemblies comprises a first plurality of electrostatically-charged drums and a second plurality of electrostatically-charged drums, wherein the first plurality of electrostatically-charged drums and the second plurality of electrostatically-charged drums are concentrically nested within one another, and wherein each of the first plurality of electrostatically-charged drums has an electrostatic charge that is opposite an electrostatic charge of each of the second plurality of electrostatically-charged drums.

6. The system of claim 5, wherein the first plurality of electrostatically-charged drums and the second plurality of electrostatically-charged drums are nested within one another in an alternating arrangement.

7. The system of claim 1, wherein the turbine engine system is a gas turbine engine system.

8. The system of claim 1, wherein the oil degradation byproducts removal system is removable from the accessory module from a top of the accessory module.

9. The system of claim 1, wherein the oil degradation byproducts removal system is removable from the accessory module from a side of the accessory module.

10. The system of claim 1, wherein the accessory module comprises a sight glass configured to provide a view of an interior of the lubricating oil reservoir and the oil degradation byproducts removal system.

11. The system of claim 1, wherein the electrostatically-charged drum assemblies include a first plurality of electrostatically-charged drum assemblies, and a second plurality of electrostatically-charged drum assemblies, wherein each of the first plurality of electrostatically-charged drum assemblies has a positive electrostatic charge, and each of the second plurality of electrostatically-charged drum assemblies has a negative electrostatic charge.

12. A system, comprising:
an oil degradation byproducts removal system configured to flow a lubricating oil flow, comprising:
electrostatically-charged drum assemblies, wherein each of the electrostatically-charged drum assemblies is coupled to a support structure configured to suspend the electrostatically-charged drum assemblies within the oil degradation byproducts removal system; and
a motor configured to drive rotation of the support structure within the oil degradation byproducts removal system;
wherein the oil degradation byproducts removal system is configured to be disposed internal to an accessory module of a turbine engine system.

13. The system of claim 12, wherein each of electrostatically-charged drum assemblies comprises electrostatically-charged drums in a nested concentric arrangement.

14. The system of claim 12 wherein the electrostatically-charged drum assemblies include a first plurality of electrostatically-charged drum assemblies, and a second plurality of electrostatically-charged drum assemblies, wherein the first plurality of electrostatically-charged drum assemblies has a positive electrostatic charge, and the second plurality of electrostatically-charged drum assemblies has a negative electrostatic charge.

15. The system of claim 12, wherein the oil degradation byproducts removal system is configured to be disposed internal to a lubricating oil reservoir of the accessory module.

16. The system of claim 12, wherein the electrostatically-charged drum assemblies are removable from the oil degradation byproducts removal system.

17. A system, comprising:
a turbine engine system; and
an accessory module, comprising;
a lubricating oil reservoir configured to supply lubricating oil to the turbine engine system; and
an oil degradation byproducts removal system disposed within the lubricating oil reservoir, wherein the oil degradation byproducts removal system comprises a plurality of electrostatically-charged drum assemblies and the plurality of electrostatically-charged drum assemblies is configured to electrostatically remove oil degradation byproducts from a flow of lubricating oil within the lubricating oil reservoir, and wherein the oil degradation byproducts removal system comprises a rotary assembly configured to drive rotation of the electrostatically-charged drum assemblies within the lubricating oil reservoir.

18. The system of claim 17, wherein the rotary assembly comprises a support structure configured to suspend the plurality of electrostatically-charged drum assemblies within the oil degradation byproducts removal system, and the support structure is configured to be rotated within the oil degradation byproducts removal system by a motor of the rotary assembly.

19. The system of claim 17, wherein the oil degradation byproducts removal system is removable from the accessory module.

20. The system of claim 17, wherein the turbine engine system comprises a gas turbine.

* * * * *